US011926474B2

(12) United States Patent
Turner et al.

(10) Patent No.: US 11,926,474 B2
(45) Date of Patent: Mar. 12, 2024

(54) REFUSE VEHICLE

(71) Applicant: Oshkosh Corporation, Oshkosh, WI (US)

(72) Inventors: Ross Turner, Oshkosh, WI (US); Joseph Nelson, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/530,715

(22) Filed: Nov. 19, 2021

(65) Prior Publication Data

US 2022/0161998 A1 May 26, 2022

Related U.S. Application Data

(60) Provisional application No. 63/117,741, filed on Nov. 24, 2020.

(51) Int. Cl.
*B65F 3/06* (2006.01)
*B65F 3/04* (2006.01)
*B65F 3/02* (2006.01)

(52) U.S. Cl.
CPC ................ *B65F 3/06* (2013.01); *B65F 3/041* (2013.01); *B65F 2003/023* (2013.01); *B65F 2003/0279* (2013.01)

(58) Field of Classification Search
CPC ....... B65F 3/06; B65F 2003/146; B65F 3/201
See application file for complete search history.

(56) References Cited

U.S. PATENT DOCUMENTS 4,729,304 A * 3/1988 Gardella .................. B65F 9/00 100/215
5,919,027 A 7/1999 Christenson
5,934,858 A 8/1999 Christenson
5,934,867 A 8/1999 Christenson
5,938,394 A 8/1999 Christenson
5,951,235 A 9/1999 Young et al.
5,967,731 A 10/1999 Brandt
5,984,609 A 11/1999 Bartlett
6,033,176 A 3/2000 Bartlett
6,062,803 A 5/2000 Christenson
6,089,813 A 7/2000 McNeilus et al.
6,120,235 A 9/2000 Humphries et al.
6,123,500 A 9/2000 McNeilus et al.

(Continued)

*Primary Examiner* — Jonathan Snelting
(74) *Attorney, Agent, or Firm* — Foley & Lardner LLP

(57) ABSTRACT

A refuse vehicle includes a body defining a storage compartment, a packer, a hydraulic system, a pressure sensor, and a controller. The hydraulic system includes a first pump and a second pump are configured to supply fluid power to a packer actuator. The packer actuator is coupled to the packer and the body and is positioned to move the packer to compact refuse within the storage compartment. The pressure sensor indicates a measured pressure a first fluid associated with the first pump or a second fluid associated with the second pump. The controller is configured to control the hydraulic system to supply fluid power to the packer actuator to move the packer. The controller is further configured to determine that (a) one or more other vehicle functions are active or (b) the measured pressure exceeds a threshold pressure. The controller is further configured to reduce the fluid power supplied to the packer actuator in response to the determination.

14 Claims, 11 Drawing Sheets

(56) References Cited

U.S. PATENT DOCUMENTS

| | | | |
|---|---|---|---|
| 6,138,557 A * | 10/2000 | Brown .................. B30B 9/3096 53/529 |
| 6,210,094 B1 | 4/2001 | McNeilus et al. |
| 6,213,706 B1 | 4/2001 | Christenson |
| 6,224,318 B1 | 5/2001 | McNeilus et al. |
| 6,315,515 B1 | 11/2001 | Young et al. |
| 6,336,783 B1 | 1/2002 | Young et al. |
| 6,350,098 B1 | 2/2002 | Christenson et al. |
| 6,447,239 B2 | 9/2002 | Young et al. |
| 6,474,928 B1 | 11/2002 | Christenson |
| 6,565,305 B2 | 5/2003 | Schrafel |
| 7,070,382 B2 | 7/2006 | Pruteanu et al. |
| 7,284,943 B2 | 10/2007 | Pruteanu et al. |
| 7,556,468 B2 | 7/2009 | Grata |
| 7,559,735 B2 | 7/2009 | Pruteanu et al. |
| 7,878,750 B2 | 2/2011 | Zhou et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,807,613 B2 | 8/2014 | Howell et al. |
| 9,216,856 B2 | 12/2015 | Howell et al. |
| 9,387,985 B2 | 7/2016 | Gillmore et al. |
| 9,494,170 B2 * | 11/2016 | Hou .................... F15B 11/0423 |
| 9,694,776 B2 | 7/2017 | Nelson et al. |
| 9,880,581 B2 | 1/2018 | Kuriakose et al. |
| 9,981,803 B2 | 5/2018 | Davis et al. |
| 10,196,205 B2 | 2/2019 | Betz et al. |
| 10,457,533 B2 | 10/2019 | Puszkiewicz et al. |
| 10,558,234 B2 | 2/2020 | Kuriakose et al. |
| 10,758,759 B2 | 9/2020 | Shively et al. |
| 10,781,090 B2 | 9/2020 | Puszkiewicz et al. |
| 10,800,605 B2 | 10/2020 | Rocholl et al. |
| 10,858,184 B2 | 12/2020 | Betz et al. |
| 10,859,167 B2 | 12/2020 | Jax et al. |
| 10,899,538 B2 | 1/2021 | Nelson et al. |
| 11,001,440 B2 | 5/2021 | Rocholl et al. |
| 11,136,187 B1 | 10/2021 | Koga et al. |
| 11,148,880 B1 | 10/2021 | Koga et al. |
| 11,173,825 B2 | 11/2021 | Nelson et al. |
| 11,254,498 B1 | 2/2022 | Koga et al. |
| 11,254,499 B2 | 2/2022 | Rocholl et al. |
| 11,254,500 B2 | 2/2022 | Buege et al. |
| 11,273,978 B2 | 3/2022 | Buege et al. |
| 2002/0159870 A1 | 10/2002 | Pruteanu et al. |
| 2003/0231944 A1 | 12/2003 | Weller et al. |
| 2004/0071537 A1 | 4/2004 | Pruteanu et al. |
| 2004/0156706 A1 | 8/2004 | Weller et al. |
| 2006/0045700 A1 | 3/2006 | Siebers et al. |
| 2007/0138817 A1 | 6/2007 | Calliari et al. |
| 2007/0154295 A1 | 7/2007 | Kuriakose |
| 2008/0038106 A1 | 2/2008 | Spain |
| 2010/0166531 A1 | 7/2010 | Bauer et al. |
| 2012/0282077 A1 | 11/2012 | Alberts et al. |
| 2017/0341860 A1 | 11/2017 | Dodds et al. |
| 2018/0265289 A1 | 9/2018 | Davis et al. |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346859 A1 | 11/2020 | Buege et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2020/0348764 A1 | 11/2020 | Clifton et al. |
| 2020/0399058 A1 | 12/2020 | Rocholl et al. |
| 2021/0002112 A1 | 1/2021 | Puszkiewicz et al. |
| 2021/0054942 A1 | 2/2021 | Jax et al. |
| 2021/0139237 A1 | 5/2021 | Nelson et al. |
| 2021/0323763 A1 | 10/2021 | Koga et al. |
| 2022/0063738 A1 | 3/2022 | Nelson et al. |

* cited by examiner

REFUSE VEHICLE

CROSS-REFERENCE TO RELATED PATENT APPLICATION

This application claims the benefit of and priority to U.S. Provisional Application No. 63/117,741, filed on Nov. 24, 2020, the entire disclosure of which is hereby incorporated by reference herein.

BACKGROUND

The present disclosure relates generally to refuse vehicles. More specifically, the present disclosure relates to control systems for refuse vehicles.

Refuse vehicles collect a wide variety of waste, trash, and other material from residences and businesses. Operators use the refuse vehicles to transport the material from various waste receptacles within a municipality to a storage facility and/or a processing facility (e.g., a landfill, an incineration facility, a recycling facility, etc.). To reduce the requisite number of trips between the waste receptacles and the storage or processing facility, the refuse may compacted by an ejector that is forced against the refuse by actuators (e.g., pneumatic cylinders, hydraulic cylinders, etc.). Once the refuse vehicle returns to the storage or processing facility, the refuse may be emptied from the refuse vehicle with the ejector.

SUMMARY

At least one embodiment relates to a refuse vehicle including body defining a storage compartment, a packer coupled the body, a hydraulic system, a pressure sensor, and a controller. The hydraulic system includes a first pump, a second pump, and a packer actuator. The first pump and the second pump are configured to supply fluid power to the packer actuator. The packer actuator is coupled to the packer and the body and is positioned to move the packer in a compacting direction to compact refuse within the storage compartment. The pressure sensor is fluidly coupled to the packer actuator and configured to indicate a measured pressure of at least one of a first fluid associated with the first pump or a second fluid associated with the second pump. The controller is operatively coupled to the packer actuator, the hydraulic system, and the pressure sensor. The controller is configured to control the hydraulic system to supply fluid power to the packer actuator such that the packer actuator moves the packer in the compacting direction. The controller is further configured to determine that (a) one or more other vehicle functions are active or (b) the measured pressure exceeds a threshold pressure. The controller is further configured to reduce the fluid power supplied to the packer actuator in response to the determination.

Another exemplary embodiment relates to a refuse packing system. The refuse packing system includes a packer, a hydraulic system, a pressure sensor, and a controller. The packer is coupled to a body that defines a storage compartment. The hydraulic system includes a first pump, a second pump, and a packer actuator. The first pump and the second pump are configured to supply fluid power to the packer actuator. The packer actuator is coupled to the packer and the body and is positioned to move the packer in a first direction. The pressure sensor is fluidly coupled to the packer actuator and is configured to indicate a measured pressure of at least one of a first fluid associated with the first pump or a second fluid associated with the second pump. The controller is operatively coupled to the packer actuator, the hydraulic system, and the pressure sensor. The controller is configured to control the hydraulic system to supply fluid power to the packer actuator such that the packer actuator moves the packer in the first direction. The controller is further configured to determine that (a) one or more other vehicle functions are active or (b) the measured pressure exceeds a threshold pressure. The controller is further configured to reduce the fluid power supplied to the packer actuator in response to the determination.

Another exemplary embodiment relates to a method for controlling a refuse packing system. The method includes providing, by a control system, fluid power to a packing actuator to activate a packing function, wherein the packing actuator is configured to move a packer. The method further includes determining, by a controller, that one or more vehicle functions are active, the one or more vehicle functions comprising hydraulically-powered functions other than the packing function. The method further includes providing, by the controller based on the determination that one or more vehicle functions are active, a first signal to at least one of a first control circuit and a second control circuit of the control system. The method further includes reducing, by the control system based on the first signal, the fluid power provided to the packing actuator.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
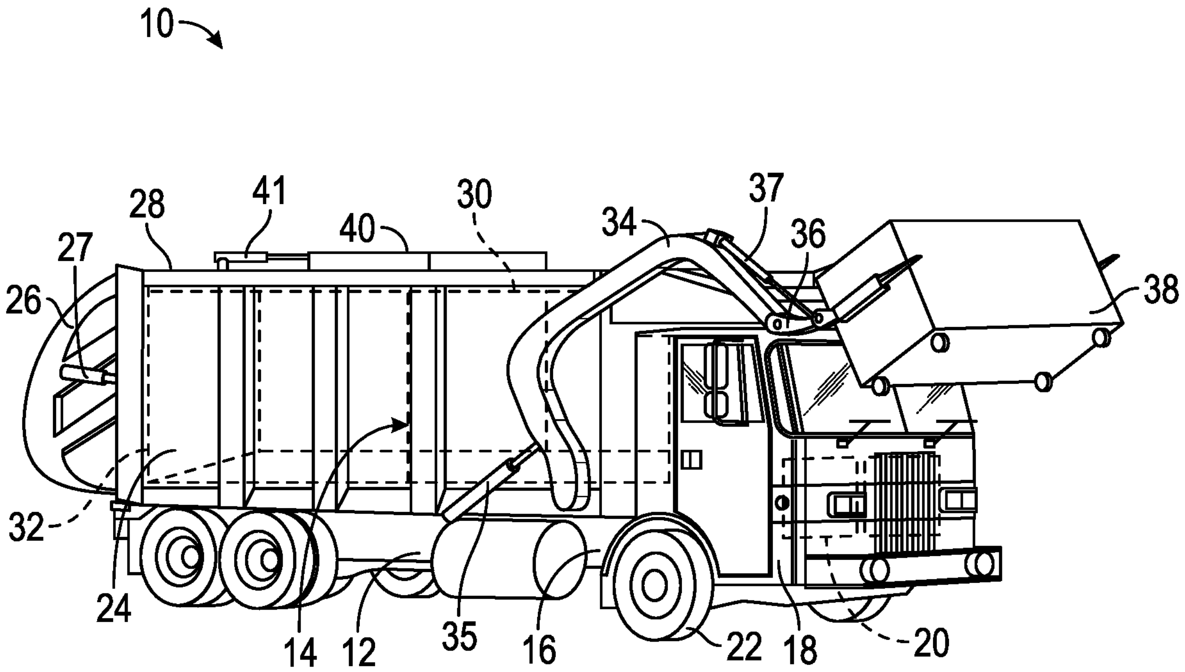
FIG. 1 is a perspective view of a front-loading refuse vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a refuse vehicle includes a body and a packer that moves through the body to compact refuse within a storage portion of the body. A pair of packer actuators (e.g., hydraulic cylinders) are coupled to the packer and to the body and are configured to extend to move the packer to compress the refuse. An engine drives a pair of pumps that provide fluid power to the packer actuators. Specifically, a front pump powers the movement of the packer actuators and either a pair of lift arms (e.g., if the refuse vehicle is front loading) or a grabber assembly (e.g., if the refuse vehicle is side loading). A rear pump powers the movement of the packer actuators, the tailgate, and a top door of the body. A controller is configured to control fluid flow from the front pump and the rear pump to the various actuators of the refuse vehicle. By way of example, the controller may operate one or more valves of a hydraulic control circuit to vary the flow to the various actuators. By way of another example, the controller may operate displacement control actuators that each vary a displacement of one of the pumps.

The controller performs automated control of a packing cycle in which the packer extends to compress the refuse and subsequently returns to its original position. In order to reduce the load on the engine during the packing cycle, the controller may be configured to reduce the fluid power supplied by one of the pumps to packer actuators in certain situations. The refuse vehicle includes a pressure sensor positioned to measure a pressure supplied to the packer actuators while the packer actuators are being extended. During extension of the packer, both of the pumps are initially used to supply fluid power to extend the packer actuators. At the beginning of the cycle, the pressure required to move the packer is generally relatively low, as the packer is simply moving the refuse without significantly compacting it. Accordingly, the load on the pumps due to extension of the packing actuators, and thus the load on the engine, is relatively low. As the packer moves closer to the rear of the body, the refuse begins to compact, increasing the pressure required to move the packer. As this pressure increases, the controller monitors the pressure using the pressure sensor. When the measured pressure exceeds a threshold pressure, the controller is configured to reduce (e.g., partially, completely), the fluid power supplied from one of the pumps to the packer actuators. This reduces the load on the engine, improving performance of the refuse vehicle and reducing the size of the engine required by the refuse vehicle.

Figure 2:
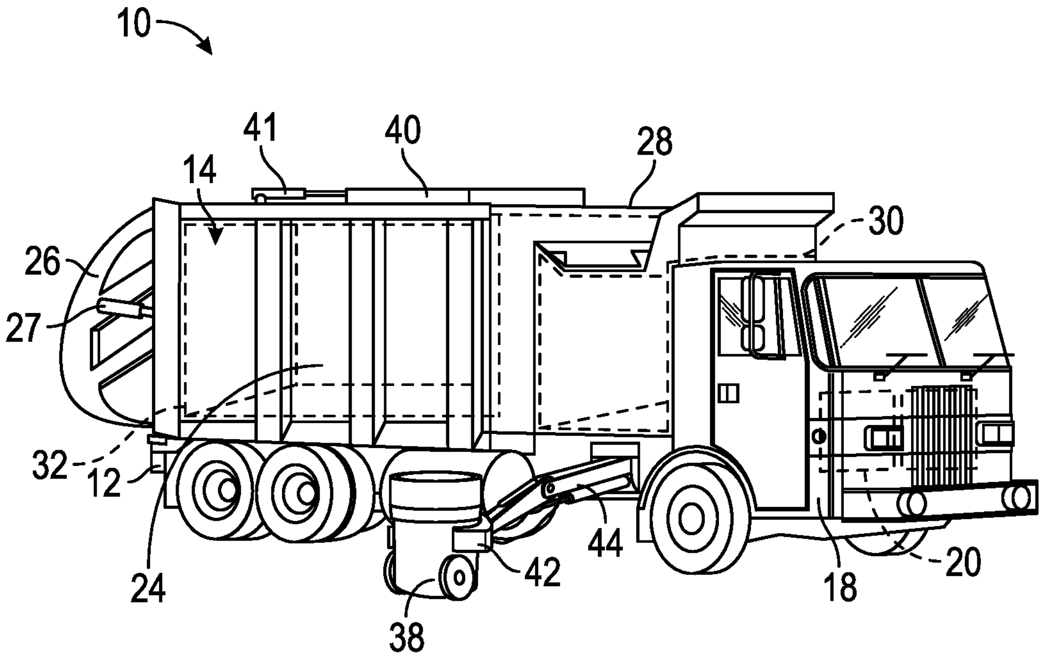
FIG. 2 is a perspective view of a side-loading refuse vehicle, according to an exemplary embodiment.
Figure 3:
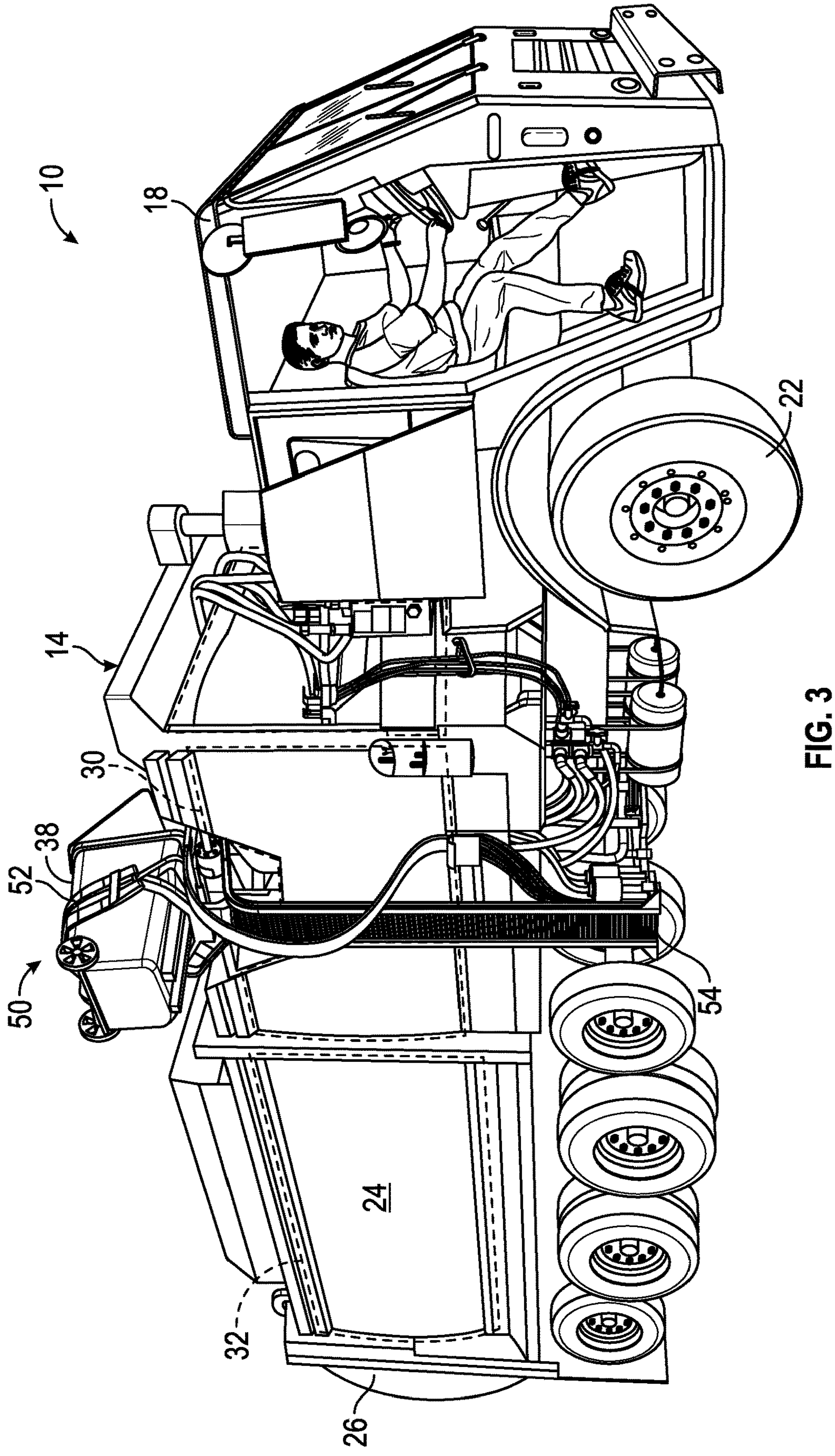
FIG. 3 is a perspective view of a zero-radius side-loading refuse vehicle, according to an exemplary embodiment.

Referring to FIGS. 1-3, a vehicle (e.g., a refuse truck, a garbage truck, a waste collection truck, a sanitation truck, etc.), shown as refuse vehicle 10, includes a support structure (e.g., a frame or chassis), shown as frame 12, and a structural body or storage device, shown as body 14. The body 14 may be of various shapes, sizes, and configurations to accommodate different styles and variations of the refuse vehicle 10. The body 14 may have two generally lateral sides running substantially parallel from a front end of the body 14 to a back end of the body 14 (e.g., relative to a primary direction of travel of the refuse vehicle 10, etc.). The frame 12 is fixedly coupled to an occupancy compartment, shown as cab 18.

As shown in FIGS. 1-3, the cab 18 is coupled to a front end of the frame 12. The cab 18 includes various components to facilitate operation of the refuse vehicle 10 by an operator (e.g., a seat, a steering wheel, hydraulic controls, etc.). In one embodiment, the refuse vehicle 10 further includes a prime mover or primary driver, shown as engine 20, coupled to the frame 12 at a position beneath the cab 18. The engine 20 provides power to a plurality of motive members or tractive elements, shown as wheels 22, and to other systems of the vehicle (e.g., a pneumatic system, a hydraulic system, etc.). The engine 20 may be configured to utilize a variety of fuels (e.g., gasoline, diesel, bio-diesel, ethanol, natural gas, etc.), according to various exemplary embodiments. According to an alternative embodiment, the engine 20 is replaced by or accompanied by one or more electric motors (e.g., in a hybrid configuration, in a pure electric configuration, etc.). The electric motors may consume electrical power from an on-board storage device (e.g., batteries, ultra-capacitors, etc.), from an on-board generator (e.g., an internal combustion engine, a thermoelectric generator, etc.), and/or from an external power source (e.g., overhead power lines, electromagnetic radiation, etc.) and provide power to the systems of the refuse vehicle 10.

According to an exemplary embodiment, the refuse vehicle 10 is configured to transport refuse from various waste receptacles within a municipality to a storage facility and/or a processing facility (e.g., a landfill, an incineration facility, a recycling facility, etc.). As shown in FIGS. 1-3, the body 14 includes panels 24, a tailgate 26, and a cover 28. The panels 24, the tailgate 26, and the cover 28 define a chamber that includes a collection chamber, shown as hopper portion 30, and a storage chamber, shown as storage portion 32. Loose refuse is placed into the hopper portion 30 and is thereafter compacted into the storage portion 32. The hopper portion 30 and the storage portion 32 provide temporary storage for refuse during transport to a waste disposal site and/or a recycling facility. In some embodiments, at least a portion of the body 14 extends in front of the cab 18. According to the embodiments shown in FIGS. 1-3, the body 14 is positioned behind the cab 18. According to an exemplary embodiment, the hopper portion 30 is positioned between the storage portion 32 and the cab 18 (i.e., refuse is initially loaded into a position behind the cab 18 and stored in a position further toward the rear of the refuse vehicle 10).

The tailgate 26 is pivotally coupled to the panels 24 such that the tailgate 26 is rotatable relative to the frame 12 about a lateral axis. A pair of actuators (e.g., hydraulic cylinders, pneumatic cylinders, linear actuators, etc.), shown as tailgate actuators 27, are coupled to the tailgate 26 and the panels 24. The tailgate actuators 27 are configured to selectively reposition the tailgate 26 between a lowered, packing, or closed position, shown in FIGS. 1 and 2, and a raised, emptying, or open position. In the closed position, the tailgate 26 extends across an opening defined by the panels 24, preventing refuse from exiting the body 14. In the open position, this opening is uncovered, permitting refuse to be evacuated from the body 14.

Referring again to the exemplary embodiment shown in FIG. 1, the refuse vehicle 10 is a front-loading refuse vehicle. As shown in FIG. 1, the refuse vehicle 10 includes manipulators, shown as a pair of arms 34, coupled to the frame 12 on either side of the cab 18. The arms 34 may be rotatably coupled to the frame 12 with a pivot (e.g., a lug, a shaft, etc.). A pair of lifting actuators (e.g., hydraulic cylinders, pneumatic cylinders, linear actuators, etc.), shown as arm lifting actuators 35, are coupled to the frame 12 and the arms 34, and extension of the arm lifting actuators 35 rotates the arms 34 about a lateral axis extending through the pivot. According to an exemplary embodiment, interface members or a container handling system, shown as forks 36, are coupled to the arms 34. The forks 36 may have a generally rectangular cross-sectional shape and are configured to engage a container, shown as the refuse container 38, (e.g., protrude through apertures within the refuse container 38, etc.). The forks 36 are pivotally coupled to the arms 34 such that forks 36 rotate relative to the arms 34 about a lateral axis to adjust an orientation of the refuse container 38. A pair of actuators (e.g., hydraulic cylinders, pneumatic cylinders, linear actuators, etc.), shown as fork actuators 37, are coupled to the arms 34 and the forks 36, and extension or retraction of the fork actuators 37 rotates the forks 36 about the lateral axis to control the orientation of the refuse container 38.

The refuse container 38 may be rectangular (e.g., an industrial refuse container, a commercial refuse container, a residential refuse container, a trash can, etc.), cylindrical (e.g., a residential refuse container, refuse bin, refuse can, a trash can, a ninety-six galleon refuse container, etc.), prismatic, or of any other shape for the storage of refuse, and may be thereby tailored for a target application. During operation of the refuse vehicle 10, the forks 36 are positioned to engage the refuse container 38 (e.g., the refuse vehicle 10 is driven into position until the forks 36 protrude through the apertures within the refuse container 38). As shown in FIG. 1, the arms 34 are rotated to lift the refuse container 38 over the cab 18. The fork actuators 37 articulate the forks 36 to tip the refuse out of the refuse container 38 and into hopper portion 30 through an opening in cover 28. The arm lift actuators 35 and the fork actuators 37 thereafter rotate the arms 34 and the forks 36 to return the empty the refuse container 38 to the ground.

According to an exemplary embodiment, a top door 40 is slidably coupled to the body 14. An actuator (e.g., a hydraulic cylinder, a pneumatic cylinder, a linear actuator, etc.), shown as top door actuator 41, is coupled to the body 14 and the top door 40. The top door actuator 41 is configured to move the top door 40 longitudinally along a top surface of the body 14 (e.g., the cover 28) between an open or loading position and a closed, sealing, or driving position. In the loading position, the top door 40 is moved away from the opening to the hopper portion 30, permitting refuse to be added to the hopper portion 30. In the driving position, the top door 40 seals the opening, thereby preventing refuse from escaping the refuse vehicle 10 (e.g., due to wind, inertia, etc.).

Referring to the exemplary embodiment shown in FIG. 2, the refuse vehicle 10 is a side-loading refuse vehicle that includes a container handling system or manipulator, shown as grabber 42, configured to interface with (e.g., engage, wrap around, selectively couple to, etc.) the refuse container 38. According to the exemplary embodiment shown in FIG. 2, the grabber 42 is movably coupled to the body 14 with an arm 44. Together, the grabber 42 and the arm 44 may form a grabber assembly. The arm 44 includes a first end coupled to the body 14 and a second end coupled to the grabber 42. One or more actuators (e.g., hydraulic cylinders, pneumatic cylinders, linear actuators, etc.) articulate the arm 44 and position the grabber 42 to interface with the refuse container 38. The arm 44 may be moveable in one or more directions (e.g., up and down, left and right, in and out, rotation, etc.) to facilitate positioning the portion of the grabber 42 to interface with the refuse container 38.

Figure 4:
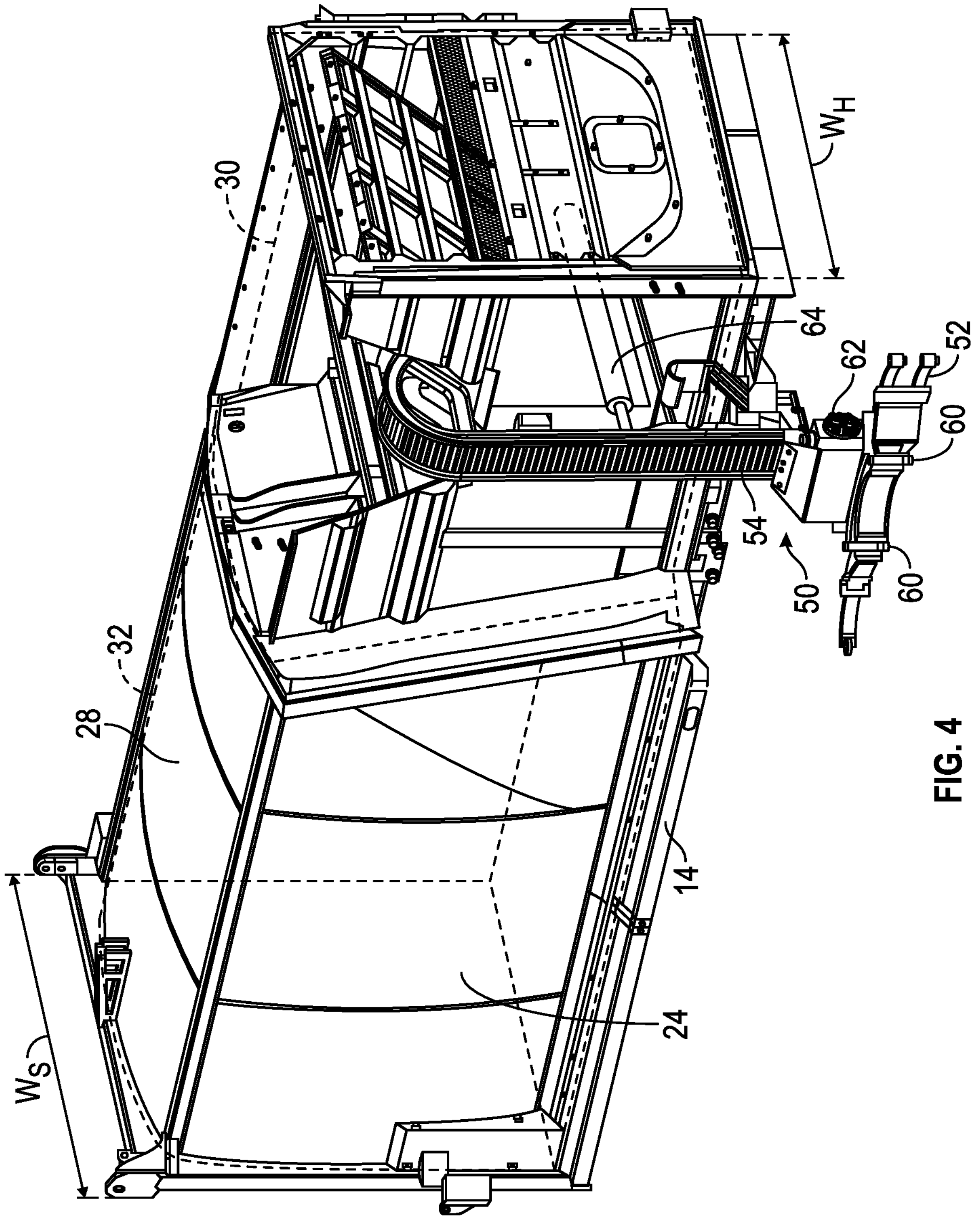
FIG. 4 is a perspective view of a body of the refuse vehicle of FIG. 3.
Figure 5:
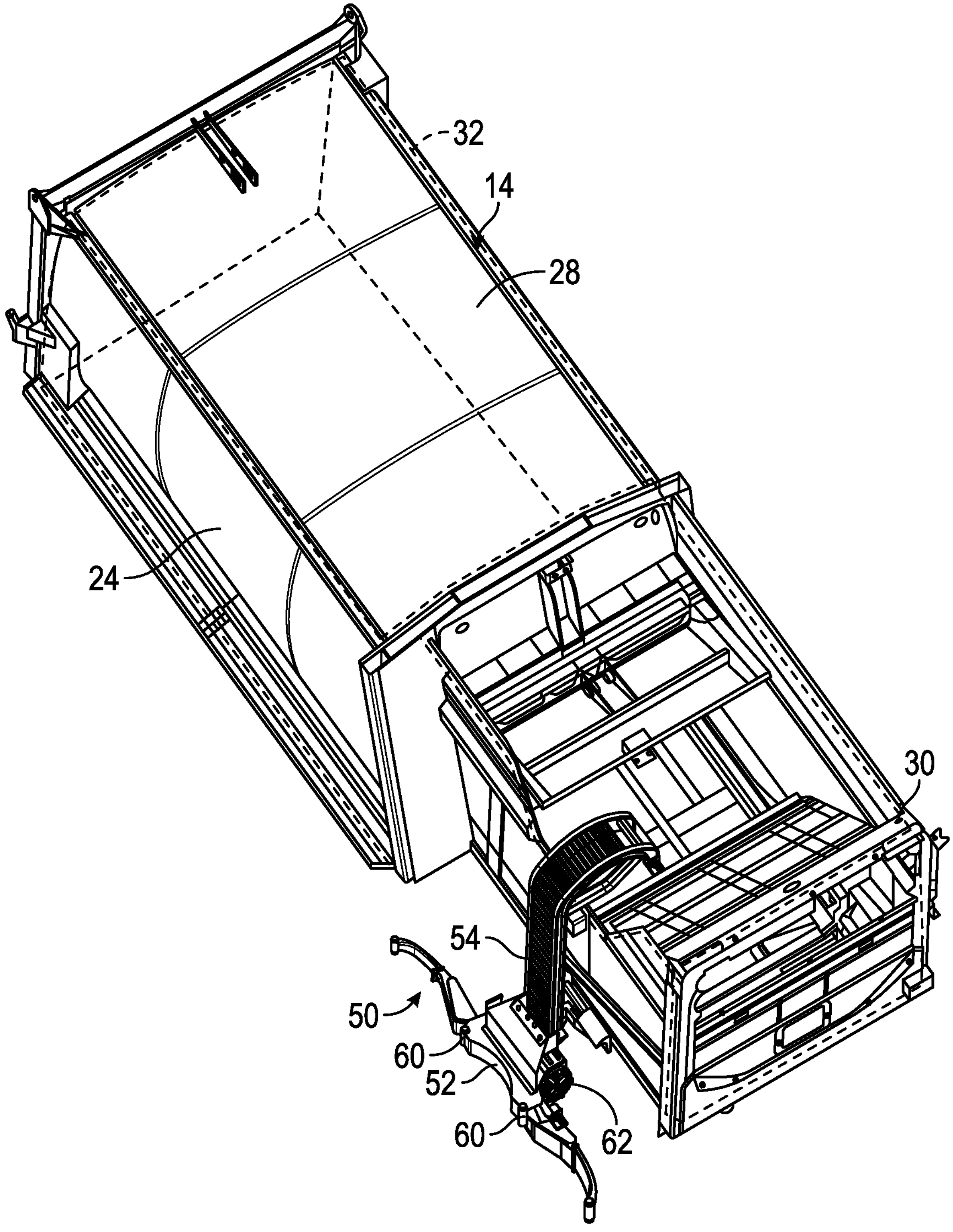
FIG. 5 is a top perspective view of the body of FIG. 4.

Referring to the exemplary embodiment shown in FIGS. 3-5, the refuse vehicle 10 is a zero-radius (e.g., ZR, etc.) side-loading refuse vehicle that includes a container handling system, shown as grabber assembly 50. The grabber assembly 50 includes a manipulator, shown as grabber 52, movably coupled to the body 14 with guide, shown as a track 54. The grabber 52 is opened and/or closed (e.g., to engage or release the refuse container 38) by one or more actuators (e.g., hydraulic cylinders, pneumatic cylinders, hydraulic motors, pneumatic motors, linear actuators, rotary actuators, etc.), shown as grabber actuators 60. The grabber 52 is moved along a length of the track by one or more actuators (e.g., hydraulic cylinders, pneumatic cylinders, hydraulic motors, pneumatic motors, linear actuators, rotary actuators, etc.), shown as grabber lift actuator 62. The grabber lift actuators 62 are coupled to the grabber 52 and the track 54. The grabber 52 and the track 54 are translatably coupled to the body 14 (e.g., by a telescoping assembly). An actuator (e.g., hydraulic cylinders, pneumatic cylinders, linear actuators, etc.), shown as grabber extend actuator 64, is coupled to the track 54 and the body 14. The grabber extend actuator 64 is configured to extend and retract to move the grabber 52 and the track 54 laterally relative to the body 14. By way of example, the grabber extend actuator 64 may be extended to move the grabber 52 and the track 54 laterally outward from the body 14 to reach a refuse container 38 that is positioned a distance away from the body 14. As shown in FIG. 4, the body 14 includes a width $W_H$ of the hopper portion 30 and a width $W_S$ of the storage portion 30. In side loading refuse vehicles such as that shown in FIGS. 3-5, the width $W_H$ of the hopper portion 30 may be less than the width $W_S$ of the storage portion 32 to accommodate the grabber assembly 50 without increasing an overall width of the refuse vehicle 10.

In operation, an operator drives the refuse vehicle 10 into position such that the grabber assembly 50 is longitudinally aligned with a refuse container 38. The grabber extend actuator 64 is then extended until the grabber 52 is proximate (e.g., in contact with, spaced a short distance from, etc.) the refuse container 38. The grabber actuator 60 is activated to close the grabber 52 on the refuse container 38. After interfacing with the refuse container 38, the grabber extend actuator 64 is retracted, and the grabber lift actuator 62 is activated to elevate the grabber 52 along the track 54. The track 54 may include a curved portion at an upper portion of the body 14 such that grabber 52 and the refuse container 38 are automatically tipped toward the hopper portion 30 of the refuse vehicle 10 when the grabber 52 reaches a predetermined position along the length of the track 54. As the grabber 52 is tipped, refuse falls through an opening defined by the cover 28 and into the hopper portion 30 of the refuse vehicle 10. The grabber lift actuator 62 and the grabber extend actuator 64 then return the empty refuse container 38 to its original position, and the grabber actuators 60 may release the refuse container 38. The top door 40 may be returned to the driving position to seal the opening, thereby preventing refuse from escaping the body 14 (e.g., due to wind, inertia, etc.).

Figure 6:
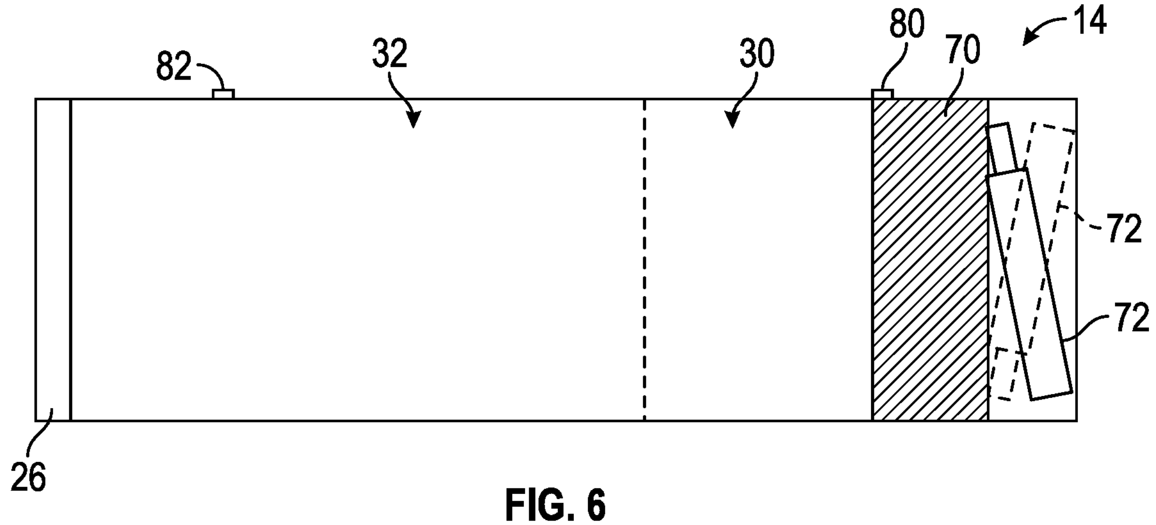
FIG. 6 is a top section view of a body of a front-loading refuse vehicle, according to an exemplary embodiment.

Referring to FIG. 6, a top section view of the body 14 of a front loading refuse vehicle (e.g., the refuse vehicle 10 of FIG. 1) is shown, according to an exemplary embodiment. A packer or ejector, shown as packer 70, is positioned within the body 14 and slidably coupled to the body 14. The packer 70 is configured to move longitudinally through the hopper portion 30 and the storage portion 32. Specifically, a pair of actuators (e.g., hydraulic cylinders, pneumatic cylinders, linear actuators, etc.), shown as packer actuators 72, are coupled to the packer 70 and the body 14. The packer actuators 72 are positioned to extend to move the packer 70 longitudinally toward the tailgate 26. The packer 70 begins in a retracted position, shown in FIG. 6. As the packer actuators 72 extend, the packer 70 moves away from the retracted position in a compressing direction, pushing refuse from the hopper portion 30 to the storage portion 32. The packer 70 presses the refuse against the tailgate 26, compressing the refuse. The packer actuators 72 then retract, returning the packer 70 in a retracting direction to the retracted position. When the operator chooses to remove the refuse from the body 14, the tailgate actuator 27 moves the tailgate 26 to the open position, and the packer actuators 72 are fully extended to eject the refuse from the back of the body 14.

The refuse vehicle 10 includes one or more position sensors configured to indicate a position of the packer 70 relative to the body 14. The position sensors may include limit switches, Hall effect sensors, reed switches, potentiometers, linear variable differential transformers, or other position sensors. In other embodiments, the positon sensor may include a velocity sensor that indicates a velocity of the packer 70, which is integrated to determine the position of the packer 70. As shown, the refuse vehicle 10 of FIG. 6 includes a first position sensor, shown as retracted position sensor 80, and a second position sensor, shown as extended position sensor 82. The retracted position sensor 80 is configured to indicate when the packer 70 is located in the retracted position. The extended position sensor 82 is configured to indicate when the packer 70 is located in an extended position (e.g., a fully extended position of the packer 70 when packing refuse in the storage compartment 32). In some embodiments (e.g., the embodiment of FIG. 7), the refuse vehicle 10 includes a third positon sensor, shown as middle position sensor 84. The middle position sensor 84 is configured to indicate when the position is located in a partially extended position between the retracted position and the extended position. In yet other embodiments, the refuse vehicle 10 includes one position sensor configured to indicate when the packer 70 is in one of multiple positions (e.g., the retracted position, the extended position, etc.). By way of example, the position sensor may indicate a distance between the packer 70 and fixed point on the body 14.

Figure 7:
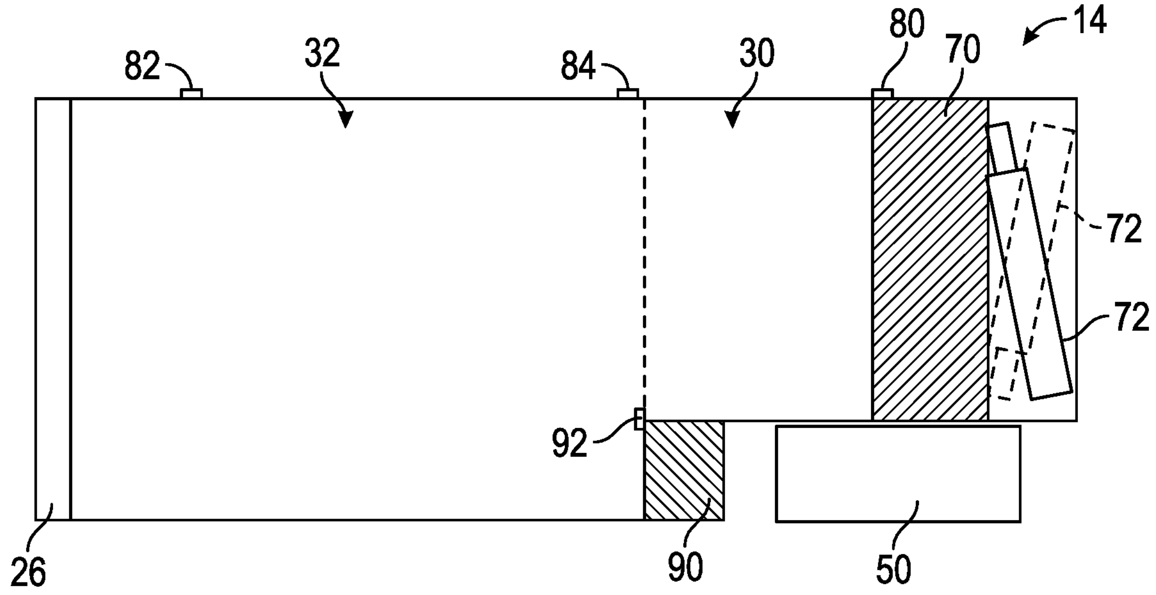
FIG. 7 is a top section view of a body of a side-loading refuse vehicle, according to an exemplary embodiment.

Referring to FIG. 7, a top section view of the body 14 of a side loading refuse vehicle (e.g., the refuse vehicle 10 of FIG. 2 or FIG. 3) is shown, according to an exemplary embodiment. The refuse vehicle 10 of FIG. 7 may be substantially similar to the refuse vehicle 10 of FIG. 6 except as otherwise specified. Like that shown in FIG. 4, the body 14 of FIG. 7 shows a width of the hopper portion 30 is less than a width of the storage portion 32 to accommodate the grabber assembly 50 without increasing an overall width of the refuse vehicle 10. The grabber assembly 50 is positioned adjacent the hopper portion 30. The refuse vehicle 10 includes a second ejector or packer, shown as secondary packer 90. The packer 90 is positioned to clear refuse from a portion of the storage portion 32 that is not cleared by the packer 70. The refuse vehicle 10 includes an actuator or coupler (e.g., a latch, a pin, etc.), shown as packer coupler 92, configured to couple the packer 70 to the packer 90. The packer coupler 92 may be activated to fixedly couple the packer 90 to the coupler 70, such that the packer 90 moves with the packer 70 under the control of the packer actuators 72. Specifically, the packer coupler 92 may be activated when the packer 70 reaches a partially extended positon between the hopper portion 30 and the storage portion 32 while the packer actuators 72 are being extended. The packer coupler 92 may be deactivated when the packer 70 reaches the partially extend position while the packer actuators 72 are being retracted. A controller (e.g., the controller 110) may determine that the packer coupler should be activated or deactivated based on information from the middle positon sensor 84. In other embodiments, the refuse vehicle 10 includes an additional actuator that moves the packer the packer 90 relative to the body 14.

Figure 8:
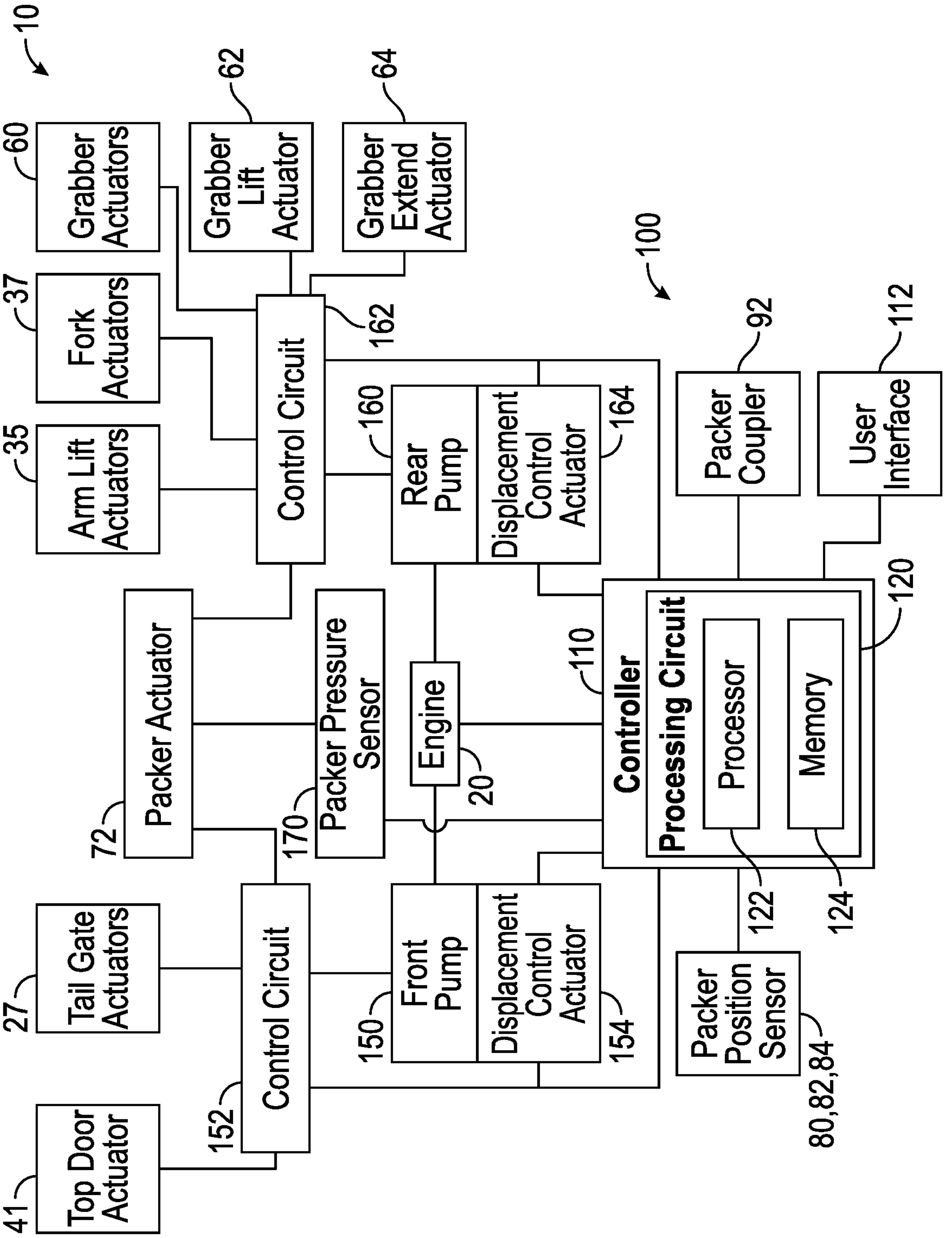
FIG. 8 is a block diagram of a control system for a refuse vehicle, according to an exemplary embodiment.

Referring to FIG. 8, a control system 100 of the refuse vehicle 10 is shown according to an exemplary embodiment. The control system 100 includes a controller 110. In one embodiment, the controller 110 is configured to selectively engage, selectively disengage, control, or otherwise communicate with components of the refuse vehicle 10. As shown in FIG. 8, the controller 110 is operatively coupled to the engine 20 (if electronically operated), the retracted position sensor 80 (if included), the extended position sensor 82 (if included), the middle position sensor 84 (if included), the packer coupler 92 (if included and electronically operated), and a user input/output device, shown as user interface 112. By way of example, the controller 110 may send and receive signals with the engine 20, the retracted position sensor 80, the extended position sensor 82, the middle position sensor 84, the packer coupler 92, and/or the user interface 112. In some embodiments, the controller 110 is coupled to additional, fewer, or different components of the refuse vehicle 10.

The user interface 112 may be configured to provide information to a user. By way of example, the user interface 112 may include screens, lights, speakers, or other devices that covey information to a user. The user interface 112 may additionally or alternatively be configured to receive information (e.g., commands) from a user. By way of example, the user interface 112 may include buttons, switches, touchscreens, or other devices that receive information as an input.

The controller 110 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 8, the controller 110 includes a processing circuit 120 containing a processor 122 and a memory 124. The processor 122 may include an ASIC, one or more FPGAs, a DSP, circuits containing one or more processing components, circuitry for supporting a microprocessor, a group of processing components, or other suitable electronic processing components. In some embodiments, the processor 122 is configured to execute computer code stored in the memory 124 to facilitate the activities described herein. The memory 124 may be any volatile or non-volatile computer-readable storage medium capable of storing data or computer code relating to the activities described herein. According to an exemplary embodiment, the memory 124 includes computer code modules (e.g., executable code, object code, source code, script code, machine code, etc.) configured for execution by the processor 122. The memory 124 includes various actuation profiles corresponding to modes of operation of the refuse vehicle 10, according to an exemplary embodiment. In some embodiments, the controller 110 may represent a collection of processing devices (e.g., servers, data centers, etc.). In such cases, the processor 122 represents the collective processors of the devices, and the memory 124 represents the collective storage devices of the devices.

The refuse vehicle 10 includes a pair of fluid power devices or pumps, shown as front pump 150 and rear pump 160. The front pump 150 and the rear pump 160 are coupled to the engine 20 (e.g., by one or more shafts). The front pump 150 and the rear pump 160 receive rotational mechanical energy from the engine 20 and provide fluid energy or fluid power (e.g., pressurized hydraulic fluid) to operate one or more functions of the refuse vehicle 10. The front pump 150 may be configured to operate one or more functions associated with the body 14 (e.g., packing, controlling the top door 41, controlling the tailgate 26), and the rear pump 160 may be configured to operate one or more functions associated with the manipulating the refuse container 38 (e.g., lifting and emptying the refuse container 38). As shown in FIG. 8, the front pump 150 is fluidly coupled to the tailgate actuators 27, the top door actuator 41, and the packer actuators 72. Accordingly, the front pump 150 may be configured to provide pressurized hydraulic fluid to power the tailgate actuators 27, the top door actuator 41 (if present), and/or the packer actuators 72. As shown in FIG. 8, the rear pump 160 is fluidly coupled to the arm lift actuators 35, the fork actuators 37, the grabber actuators 60, the grabber lift actuators 62, the grabber extend actuator 64, and the packer actuators 72. Accordingly, the rear pump 160 may be configured to provide pressurized hydraulic fluid to power the arm lift actuators 35 (if present), the fork actuators 37 (if present), the grabber actuators 60 (if present), the grabber lift actuators 62 (if present), the grabber extend actuator 64 (if present), and/or the packer actuators 72.

The front pump 150 is indirectly fluidly coupled to the tailgate actuators 27, the top door actuator 41, and the packer actuators 72 through a hydraulic or pneumatic circuit containing one or more fluid control devices or valves, shown as control circuit 152. The control circuit 152 may be operatively coupled to the controller 110 such that the control circuit 152 may be controlled by signals from the controller 110. Accordingly, the controller 110 may receive signals from and/or provide signals to control operation of the tailgate actuators 27, the top door actuator 41 (if included), and/or the packer actuators 72. Additionally or alternatively, the control circuit 152 may be passively controlled (e.g., through pressure feedback within the control circuit 152). The control circuit 152 is configured to control the flow of fluid between the front pump 150 and the tailgate actuators 27, the top door actuator 41, and the packer actuators 72. The control circuit 152 may control the flow rate, the flow direction, the pressure, or other properties of the fluid. The control circuit 152 may include conduits (e.g., hoses, pipes, etc.), directional control valves, relief valves, check valves, orifices, flow control valves, or other hydraulic or pneumatic components. The control circuit 152 may provide feedback (e.g., pressure, fluid flow, etc.) to control operation of the front pump 150 and/or the rear pump 160.

The rear pump 160 is indirectly fluidly coupled to the arm lift actuators 35, the fork actuators 37, the grabber actuators 60, the grabber lift actuators 62, the grabber extend actuator 64, and the packer actuators 72 through a hydraulic or pneumatic circuit containing one or more fluid control devices or valves, shown as control circuit 162. The control circuit 162 is operatively coupled to the controller 110 such that the control circuit 162 may be controlled by signals from the controller 110. Accordingly, the controller 110 may receive signals from and/or provide signals to control operation of the arm lift actuators 35 (if included), the fork actuators 37 (if included), the grabber actuators 60 (if included), the grabber lift actuators 62 (if included), the grabber extend actuator 64 (if included), and/or the packer actuators 72. Additionally or alternatively, the control circuit 162 may be passively controlled (e.g., through pressure feedback within the control circuit 162). The control circuit 162 is configured to control the flow of fluid between the rear pump 160 and the arm lift actuators 35, the fork actuators 37, the grabber actuators 60, the grabber lift actuators 62, the grabber extend actuator 64, and the packer actuators 72. The control circuit 162 may control the flow rate, the flow direction, the pressure, or other properties of the fluid. The control circuit 162 may include conduits (e.g., hoses, pipes, etc.), directional control valves, relief valves, check valves, orifices, flow control valves, or other hydraulic or pneumatic components. The control circuit 162 may provide feedback (e.g., pressure, fluid flow, etc.) to control operation of the front pump 150 and/or the rear pump 160.

In some embodiments, the front pump 150 includes an actuator, shown as displacement control actuator 154. The displacement control actuator 154 is configured to vary a displacement of the front pump 150 (i.e., an amount of fluid displaced by the front pump 150 for a given input speed). By way of example, the displacement control actuator 154 may include a linear actuator (e.g., a hydraulic cylinder, an electric motor, etc.) that actuates a swash plate of the front pump 150 to vary the displacement of the front pump 150. By varying the displacement, the displacement control actuator 154 may vary a load on the engine 20 from the front pump 150. By way of example, with the displacement control actuator 154 in a maximally extended position, the front pump 150 may displace a minimal amount of fluid (e.g., a negligible amount of fluid). By way of example, with the displacement control actuator 154 in a minimally extended position, the front pump 150 may displace a maximum amount of fluid.

In some embodiments, the rear pump 160 includes an actuator, shown as displacement control actuator 164. The displacement control actuator 164 is configured to vary a displacement of the rear pump 160 (i.e., an amount of fluid displaced by the rear pump 160 for a given input speed). By way of example, the displacement control actuator 164 may include a linear actuator (e.g., a hydraulic cylinder, an electric motor, etc.) that actuates a swash plate of the rear pump 160 to vary the displacement of the rear pump 160. By varying the displacement, the displacement control actuator 164 may vary a load on the engine 20 from the rear pump 160. By way of example, with the displacement control actuator 164 in a maximally extended position, the rear pump 160 may displace a minimal amount of fluid (e.g., a negligible amount of fluid). By way of example, with the displacement control actuator 164 in a minimally extended position, the rear pump 160 may displace a maximum amount of fluid.

The control system 100 includes a pressure sensor (e.g., a pressure transducer, etc.), shown as pressure sensor 170, fluidly coupled to the packer actuators 72. Specifically, the pressure sensor 170 may be positioned to measure a pressure Pp, which is a fluid pressure applied to the packer actuators 72 while the packer actuators 72 are being extended. By way of example, the pressure sensor 170 may be directly fluidly coupled to a cap end of each packer actuator 72 (i.e., an end of each packer actuator 72 opposite the rod end). The pressure sensor 170 may be operatively coupled to the controller 110 such that the pressure sensor 170 provides a signal to the controller 110 indicating the measured pressure.

Figure 9:
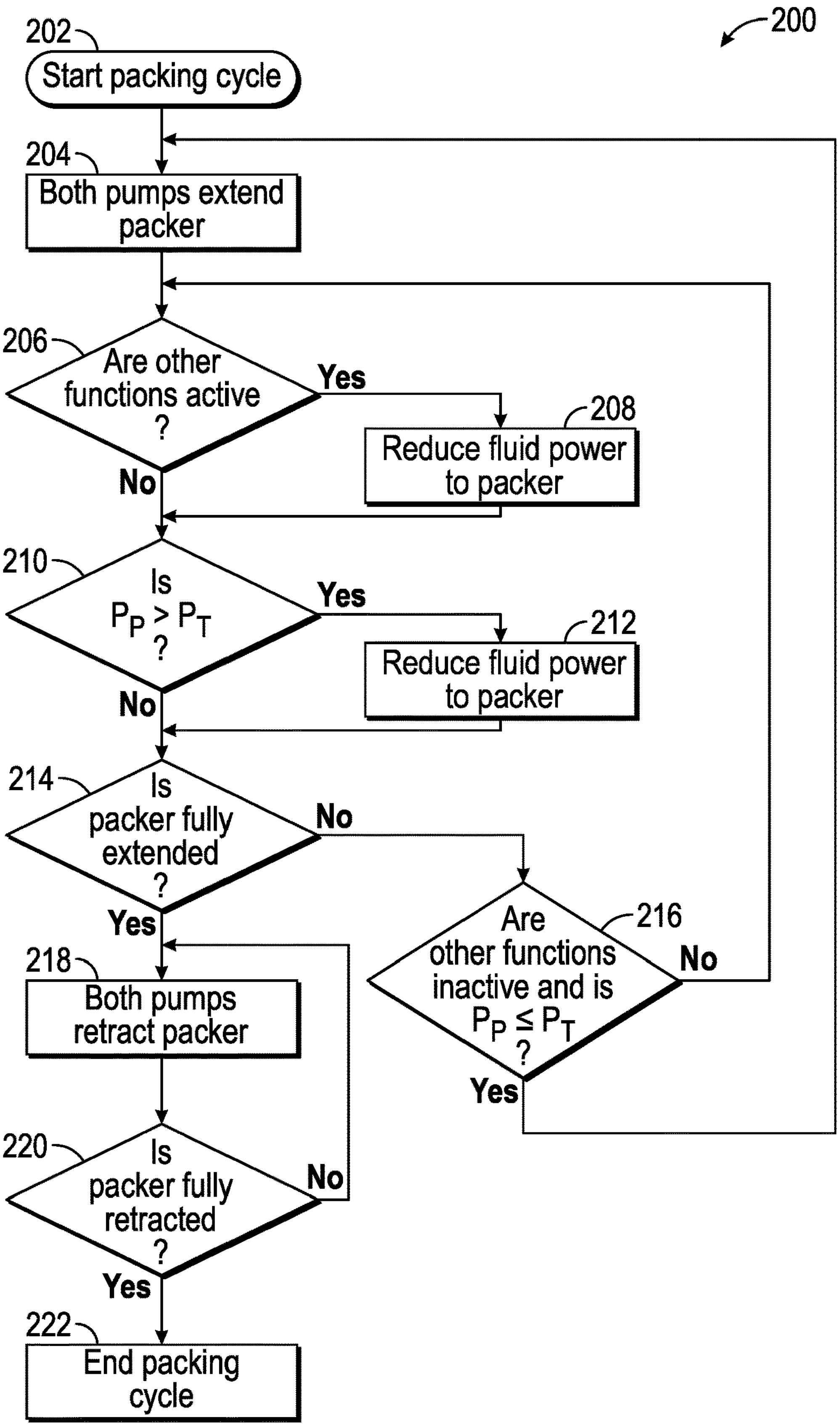
FIG. 9 is flowchart of a method of controlling packing actuators to pack refuse within a body of a refuse vehicle, according to an exemplary embodiment.
Figure 10:
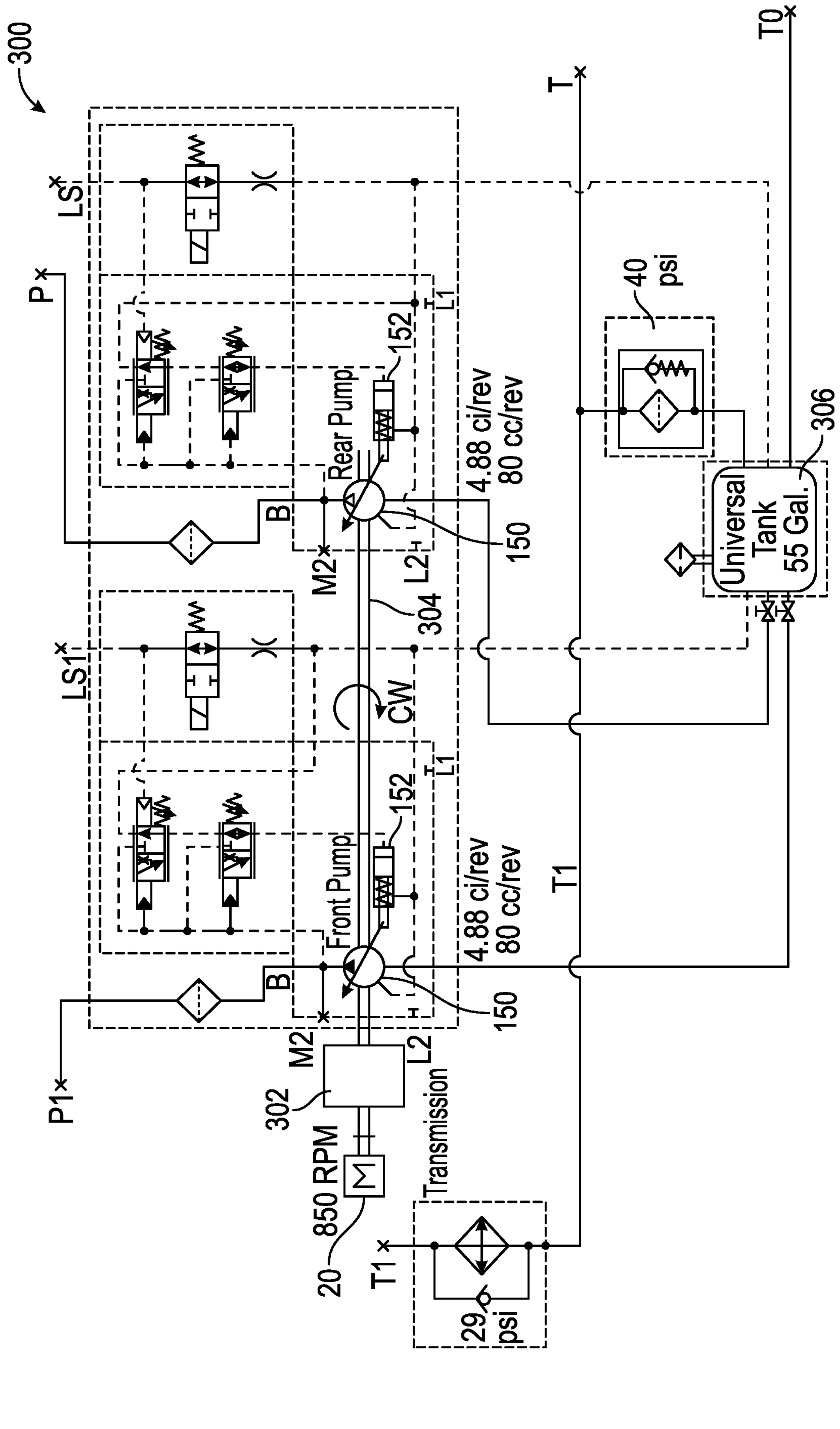
FIGS. 10-13 are diagrams illustrating a hydraulic circuit of a side-loading refuse vehicle, according to an exemplary embodiment.

Referring to FIG. 9, a method of controlling the packing actuators 72 to pack refuse within the body 14 is shown as method 200 according to an exemplary embodiment. In some embodiments, the method 200 is executed by the controller 110. By way of example, instructions for executing the method 200 may be stored in the memory 124 and executed by the processor 122.

In step 202, the controller 110 starts a packing cycle (e.g., an extension of the packer 70 into the storage portion 32 to compress refuse and a subsequent return of the packer 70 to the retracted position). In some embodiments, the controller 110 executes the packing cycle in response to an operator input (e.g., through the user interface 112). In some embodiments, the controller 110 automatically and periodically executes the packing cycle. By way of example, the controller 110 may determine that the packing cycle should be executed in response to expiration of a predetermined time period (e.g., once every 10 minutes, once every 30 minutes, once per hour, etc.). By way of another example, the controller 110 may determine that the packing cycle should be executed in response to a threshold amount of refuse being added to the hopper portion 30. In one such example, the controller 110 determines that the packing cycle should be executed in response to a threshold number of refuse containers 38 being emptied into the hopper portion 30 (e.g., two refuse containers 38, five refuse containers 38, ten refuse containers 38, etc.). The controller 110 may determine the amount of refuse containers 38 that have been emptied into the hopper portion 30 based on an operator input and/or based on the commands sent to the arm lift actuators 35, the fork actuators 37, the grabber actuators 60, the grabber lift actuator 62, and/or the grabber extend actuators 64.

The controller 110 may control the packer actuators 72 based on an autopack cycle quantity setting and/or a spool duty cycle setting stored in the memory 124. The autopack cycle quantity setting and the spool duty cycle setting may be set during the initial commissioning of the refuse vehicle 10 and/or specified by an operator (e.g., through the user interface 112). In some embodiments, the autopack cycle quantity setting specifies a maximum amount of packing cycles that can be executed before the body 14 should be emptied. By way of example, the controller 110 may provide a notification (e.g., through the user interface 112) prompting the operator to empty the refuse from the body 14 in response to a determination that the number of packing cycles executed exceeds the autopack cycle quantity setting. By way of another example, the controller 110 may disable the packer actuators 72 in response to a determination that the number of packing cycles executed exceeds the autopack cycle quantity setting. In some embodiments, the spool duty cycle setting specifies a duty cycle of the packer 70 (e.g., packing cycles should be executed at a frequency such that the packer 70 is operating throughout 10% of the operating time of the refuse vehicle 10, etc.).

In step 204, both the front pump 150 and the rear pump 160 are activated to extend the packer actuators 72, forcing the packer 70 toward the tailgate 26 in the compressing direction. The controller 110 may activate the displacement control actuator 154 and/or the displacement control actuator 164 to increase the displacement of the front pump 150 and/or the rear pump 160 to reach a target displacement (e.g., a target displacement range). The controller 110 may operate the control circuit 152 and/or the control circuit 162 to vary the flow of fluid supplied to the packer actuators 72 by the front pump 150 and/or the rear pump 160. Specifically, the control circuit 152 and/or the control circuit 162 may vary a pressure of the fluid, a flow direction of the fluid, a flow rate of the fluid, and/or another property of the fluid. By way of example, the control circuit 152 may include a first directional control valve, and the controller 110 may send a signal to the first directional control valve that causes the first directional control valve to supply fluid to the cap ends of the packer actuators 72. Additionally or alternatively, the control circuit 162 may include a second directional control valve, and the controller 110 may send a signal to the second directional control valve that causes the second directional control valve to supply fluid to the cap ends of the packer actuators 72.

In step 206, the controller 110 determines if one or more other functions (e.g., hydraulically-powered functions other than the packer actuators 72) of the refuse vehicle 10 are active. The other functions may include functions that impart a load on the front pump 150 and/or the rear pump 160, thereby loading the engine 20. The engine 20 may supply a limited amount of power to each pump, so increasing the load of a first function (e.g., the packing actuators 72) on a pump may reduce the performance of a second function (e.g., the grabber assembly 50) powered by that pump. Accordingly, by reducing the load imparted by the first function, the performance of the second function may improve.

By way of example, by reducing the load imparted on the rear pump 160 by packer actuators 72, the performance of the grabber assembly 50 may be improved (e.g., the speed of the grabber assembly 50 may be increased, the force exerted by the grabber assembly 50 may be increased, the time required for the grabber assembly 50 to respond to a command may be reduced, etc.). Because an operator may not directly observe the operation of the packer 70 (e.g., due to the visually obscured position of the packer 70 behind the cab 18), the operator may not notice a decrease in performance (e.g., a decrease in movement speed) of the packer 70. However, the operator may notice a decrease in performance of other functions of the refuse vehicle. By determining if one or more other functions are active, the controller 110 may determine if reducing the load imparted on the front pump 150 or the rear pump 160 by the packer actuators 72 will improve the performance of another function, thereby improving the operator's perception of the performance of the refuse vehicle 10. By reducing the load of the packer actuators 72 while other functions are active, the load on the engine 20 may be reduced, improving fuel economy.

If the controller 110 determines that the other functions are active, the method 200 may proceed to step 208. If the controller 110 determines that the other functions are not active, the method 200 may proceed to step 210. In step 208, the transfer of fluid power from one of the front pump 150 or the rear pump 160 to the packer actuators 72 is reduced such that only one of the pumps provides most or all of the fluid power used to extend the packer actuators 72. In some embodiments, the transfer of fluid power from one of the front pump 150 or the rear pump 160 to the packer actuators 72 is disabled such that no fluid power is transferred from the one of the front pump 150 or the rear pump 160 to the packer actuators 72. In other embodiments, the transfer of fluid power from one of the front pump 150 or the rear pump 160 to the packer actuators 72 is partially reduced.

In some embodiments, the controller 110 operates the displacement control actuator 154 to reduce the amount of fluid displaced by the front pump 150, thereby decreasing the fluid power transferred from the front pump 150 to the packer actuators 72. In some embodiments, the controller 110 operates the control circuit 152 to reduce the pressure and/or flow rate of fluid supplied from the front pump 150 to the packer actuators 72, thereby decreasing the fluid power transferred from the front pump 150 to the packer actuators 72. By way of example, a directional control valve that directs fluid from the front pump 150 to the packer actuators 72 may be partially or completely closed to reduce fluid flow to the packer actuators 72.

In some embodiments, the controller 110 operates the displacement control actuator 164 to reduce the amount of fluid displaced by the rear pump 160, thereby decreasing the fluid power transferred from the rear pump 160 to the packer actuators 72. In some embodiments, the controller 110 operates the control circuit 162 to reduce the pressure and/or flow rate of fluid supplied from the rear pump 160 to the packer actuators 72, thereby decreasing the fluid power transferred from the rear pump 160 to the packer actuators

72. By way of example, a directional control valve that directs fluid from the rear pump 160 to the packer actuators 72 may be partially or completely closed to reduce fluid flow to the packer actuators 72.

According to one exemplary embodiment, in step 206, the controller determines if at least one of the arm lift actuators 35, the fork actuators 37, the grabber actuators 60, the grabber lift actuator 62, or the grabber extend actuators 64 are in use. In response to a determination that at least one of the arm lift actuators 35, the fork actuators 37, the grabber actuators 60, the grabber lift actuator 62, or the grabber extend actuators 64 are in use, in step 208 the controller 110 reduces the fluid power transferred from the rear pump 160 to the packer actuators 72. Specifically, the controller 110 may provide signals to the control circuit 162 to reduce fluid flow from the rear pump 160 to the packer actuators 72. By reducing the load on the rear pump 160 from the packer actuators 72, a greater portion of the fluid power output of the rear pump 160 may be directed toward the other functions, and the performance of the grabber assembly 50, the arm lift actuators 35, and/or the fork actuators 37 may be improved.

In step 210, the controller 110 determines if the pressure $P_p$ measured by the pressure sensor 170 is greater than a threshold pressure $P_T$. The pressure $P_p$ is indicative of (e.g., proportional to) a force being applied by the packer actuators 72 on the packer 70 to move the packer 70 toward the tailgate 26. When the packer 70 is near the retracted position, the packer 70 may simply push the refuse through the body 14 without having to compress the refuse, and the pressure $P_p$ may be relatively low. As the packer 70 nears the tailgate 26, the packer 70 may begin compacting the refuse, increasing the pressure $P_p$. As the distance between the tailgate 26 and the packer 70 decreases, the refuse becomes more compact and the pressure $P_p$ increases even further. As the pressure $P_p$ increases, the load of the packer actuators 72 on the front pump 150 and the rear pump 160 increases, and thus the load on the engine 20 increases. The threshold pressure $P_T$ may be set such that the pressure $P_p$ exceeds the threshold pressure $P_T$ when the packer 70 is compacting the refuse against the tailgate 26. In response to a determination that the measured pressure $P_p$ is greater than the threshold pressure $P_T$, the method 200 proceeds to step 212, in which the controller 110 reduces the fluid power provided by one of the pumps to the packer actuators 72. This may reduce the load on the engine 20 when the load on the engine 20 from driving the packer actuators 72 would normally be highest. This reduces the maximum torque and output power required from the engine 20 to operate the packer 70 (e.g., when the engine 20 is at idle). This may improve the fuel economy of the refuse vehicle 10. In some embodiments, the speed of the packer 70 is minimally affected by disabling one of the pumps, as the flow rate of fluid from the pumps to the packer actuators 72 may have already been reduced to accommodate the relatively high pressure required to move the packer 70 while compacting refuse. Additionally, the packer 70 may have to move only a relatively short distance in this configuration. Accordingly, the change in duration of the packing cycle relative to a refuse vehicle that does utilize steps 210 and 212 may not be noticeable to an operator of the refuse vehicle 10 (i.e., the packing cycle may not require a noticeably longer time period to complete).

In some embodiments, the threshold pressure $P_T$ is predetermined and stored in the memory 214. In other embodiments, the threshold pressure $P_T$ varies (e.g., based on a mode of operation of the refuse vehicle, based on one or more operator inputs, based on one or more sensor readings, etc.). In some embodiments, the threshold pressure $P_T$ is indicative of a particular compression (e.g., a density) of the refuse compacted between the packers 70 and 90 and the tailgate 26. In some embodiments, the threshold pressure $P_T$ is between 1000 psi and 3000 psi. In some embodiments, the threshold pressure $P_T$ is between 1000 psi and 2000 psi. In some embodiments, the threshold pressure $P_T$ is approximately 1500 psi.

In response to a determination that the pressure $P_p$ exceeds the threshold pressure $P_T$, the method 200 may proceed to step 212. If the controller 110 determines that the pressure $P_p$ is less than or equal to the threshold pressure $P_T$, the method 200 skips step 212 and proceeds directly to step 214. In step 212, the transfer of fluid power from one of the front pump 150 or the rear pump 160 to the packer actuators 72 is reduced such that only one of the pumps provides most or all of the fluid power to extend the packer actuators 72. In some embodiments, the transfer of fluid power from one of the front pump 150 or the rear pump 160 to the packer actuators 72 is disabled such that no fluid power is transferred from the one of the front pump 150 or the rear pump 160 to the packer actuators 72. In other embodiments, the transfer of fluid power from one of the front pump 150 or the rear pump 160 to the packer actuators 72 is partially reduced.

In some embodiments, the selection of which pump will be partially or completely disabled in step 212 is predetermined. By way of example, the controller 110 may reduce the fluid power supplied to the packer actuators 72 by the rear pump 160 whenever the controller 110 determines that the pressure $P_p$ exceeds the threshold pressure $P_T$ in step 210. In other embodiments, the selection of which pump will be partially or completely disabled in step 212 varies. By way of example, the selection may vary based on an operator input (e.g., through the user interface 212).

In some embodiments, the controller 110 operates the displacement control actuator 154 to reduce the amount of fluid displaced by the front pump 150, thereby decreasing the fluid power transferred from the front pump 150 to the packer actuators 72. In some embodiments, the controller 110 operates the control circuit 152 to reduce the pressure and/or flow rate of fluid supplied from the front pump 150 to the packer actuators 72, thereby decreasing the fluid power transferred from the front pump 150 to the packer actuators 72. By way of example, a directional control valve that directs fluid from the front pump 150 to the packer actuators 72 may be partially or completely closed to reduce fluid flow to the packer actuators 72.

In some embodiments, the controller 110 operates the displacement control actuator 164 to reduce the amount of fluid displaced by the rear pump 160, thereby decreasing the fluid power transferred from the rear pump 160 to the packer actuators 72. In some embodiments, the controller 110 operates the control circuit 162 to reduce the pressure and/or flow rate of fluid supplied from the rear pump 160 to the packer actuators 72, thereby decreasing the fluid power transferred from the rear pump 160 to the packer actuators 72. By way of example, a directional control valve that directs fluid from the rear pump 160 to the packer actuators 72 may be partially or completely closed to reduce fluid flow to the packer actuators 72.

According to one exemplary embodiment, in step 210, the controller 110 determines if the measured pressure $P_p$ is greater than the threshold pressure $P_T$. In response to a determination that the measured pressure $P_p$ is greater than the threshold pressure $P_T$, the controller 110 reduces the fluid power transferred from the rear pump 160 to the packer actuators 72. Specifically, the controller 110 may provide signals to the control circuit 162 to reduce fluid flow from the rear pump 160 to the packer actuators 72. By reducing the fluid power supplied by the rear pump 160, the overall load on the engine 20 may be reduced. This may reduce the maximum torque and output power required from the engine 20 during the packing cycle, increasing the fuel economy of the refuse vehicle 10.

By implementing steps 210 and 212 into the method 200, the peak requirements of the engine 20 may be reduced. According to various exemplary embodiments, the engine 20 is a 9 liter engine that operates using compressed natural gas. In a first one such embodiment, steps 210 and 212 are omitted from the method 200. Accordingly, both the front pump 150 and the rear pump 160 are used to extend the packer actuators 72 throughout the packing cycle, regardless of the pressure applied to the packer actuators 72. When the packer 70 reaches the fully extended position during the packing cycle, both the front pump 150 and the rear pump 160 are supplying maximum system pressure (e.g., approximately 3200 psi, etc.) to the packer actuators 72, and the load experienced by the engine 20 is approximately 80 horsepower and 366 ft-lbs of torque. The maximum system pressure may be defined by one or more relief valves within the control circuit 152 and/or the control circuit 162. In a second one such embodiment, steps 210 and 212 are included in the method 200, and the threshold pressure $P_T$ is set to 1500 psi. When both pumps are providing fluid to the packer actuators 72 at 1500 psi, the load experienced by the engine 20 is approximately 43 horsepower and 194 ft-lbs of torque. When the measured pressure $P_p$ increases above 1500 psi, the controller 110 prevents the rear pump 160 from supplying fluid power to the packer actuators 72 (e.g., disables the rear pump 160). When the packer 70 reaches the fully extended position during the packing cycle, the front pump 150 supplies maximum system pressure to the packer actuators 72, and the load experienced by the engine 20 is approximately 43 horsepower and 197 ft-lbs of torque. Accordingly, by implementing step 210 and step 212 of the method 200, the load on the engine 20 (e.g., the maximum output torque and the maximum output power required of the engine) is reduced by approximately 50%. This may increase the fuel economy of the refuse vehicle 10. Because the threshold pressure $P_T$ is set to 1500 psi, movement of the packer 70 may have already slowed due to the resistance of the refuse when the controller 110 deactivates the rear pump 160. Accordingly, the duration of the pack cycle of the first embodiment may not be noticeably different from the duration of the pack cycle of the second embodiment.

In step 214, the controller 110 determines if the packer 70 is fully extended. In some embodiments, the controller 110 utilizes the extended position sensor 84 to determine if the packer 70 is fully extended. By way example, the controller 110 may determine that the packer 70 is fully extended when the extended position sensor 84 indicates that the packer 70 is in an extended position (e.g., greater than a threshold distance from the fully retracted position). In some embodiments, the controller 110 determines that the packer 70 is fully extended based a duration that the packer actuators 72 have been extending. By way of example, the controller 110 may determine that the packer 70 is fully extended in response to duration that the packer actuators 72 have been extending exceeding a predetermined threshold duration (e.g., 10 seconds, 15 seconds, 30 seconds, etc.). In such an embodiment, the threshold duration may be sufficient for the packer 70 the compress the refuse within the storage portion 32 such that the pressure applied by the front pump 150 and/or the rear pump 160 to the packer actuators 72 reaches the maximum system pressure. With the packer actuators 72 at the maximum system pressure, the force exerted by the packer actuators 72 on the packer 70 may be equal to the normal force by the refuse on the packer 70 such that the packer 70 is stationary.

If the controller 110 determines that the packer 70 is not fully extended in step 214, the method 200 proceeds to step 216. In step 216, the controller 110 determines if both (a) the one or more other functions of step 206 are inactive and (b) the pressure $P_p$ is less than or equal to the threshold pressure $P_T$. If the controller 110 determines that both (a) the one or more other functions of step 206 are inactive and (b) the pressure $P_p$ is less than or equal to the threshold pressure $P_T$, the method 200 returns to step 204. If the controller determines that one or both of (a) the one or more other functions of step 206 are active and (b) the pressure $P_p$ is greater than the threshold pressure $P_T$, the method 200 returns to step 206. Accordingly, the packer actuators 72 continue to extend until the packer 70 is fully extended. While the packer actuators 72 extend, the controller 110 reduces the fluid power supplied by one of the pumps if one of the one or more other functions of step 206 are active and/or if the pressure $P_p$ is greater than the threshold pressure $P_T$. If the refuse vehicle 10 returns to a condition where both (a) the one or more other functions of step 206 are inactive and (b) the pressure $P_p$ is less than or equal to the threshold pressure $P_T$, the controller 110 may again activate both pumps to extend the packer 70.

If the controller 110 determines that the packer 70 is fully extended in step 214, the method 200 proceeds to step 218. In step 218, the controller 110 operates both the front pump 150 and the rear pump 160 to retract the packer 70. By way of example, the controller 110 may provide signals to the control circuit 152, the control circuit 162, the displacement control actuator 154, and/or the displacement control actuator 164 to retract the packer actuators 72.

In step 220, the controller 110 determines if the packer 70 is fully retracted. In some embodiments, the controller 110 utilizes the retracted position sensor 80 to determine if the packer 70 is fully retracted. By way of example, the controller 110 may determine that the packer 70 is fully retracted in response to retracted position sensor 80 indicating that the packer 70 is in the retracted position. If the controller 110 determines that the packer 70 is not fully retracted, the method 200 returns to step 218, and the packer actuators 72 continue to retract the packer 70. If the controller 110 determines that the packer 70 is fully retracted, the method 200 proceeds to step 222, and the packing cycle is complete.

In a situation where the fluid power supplied from one of the pumps to the packer actuators 72 has already been reduced (e.g., during step 208, during a previous step 212) when the method reaches step 206 or step 210, one or more of step 206, step 208, step 210, or step 212 may be skipped. By way of example, when the controller 110 has determined that the fluid power supplied by one of the pumps should be reduced, the controller 110 may not need to determine if the fluid power should be reduced again until step 204 has been completed and both pumps are providing full fluid power. Alternatively, step 206 and step 208 may be not be skipped.

Referring to FIGS. 10-13, a hydraulic system 300 of a side-loading refuse vehicle is shown according to an exemplary embodiment. By way of example, the hydraulic system 300 may be included in the refuse vehicle 10 of FIG. 3. In each of FIGS. 10-13, an "X" with a nearby label (e.g., P1, T1, LS, etc.) may indicate a connection to another point the hydraulic system 300 having matching label. As shown, the engine 20 is coupled to the front pump 150 and the rear pump 160 by a transmission 302 and a shaft 304. The front pump 150 and the rear pump 160 are fluidly coupled to and draw fluid from a tank 306. The front pump 150 and the rear pump 160 may be load-sensing pumps.

Figure 11:
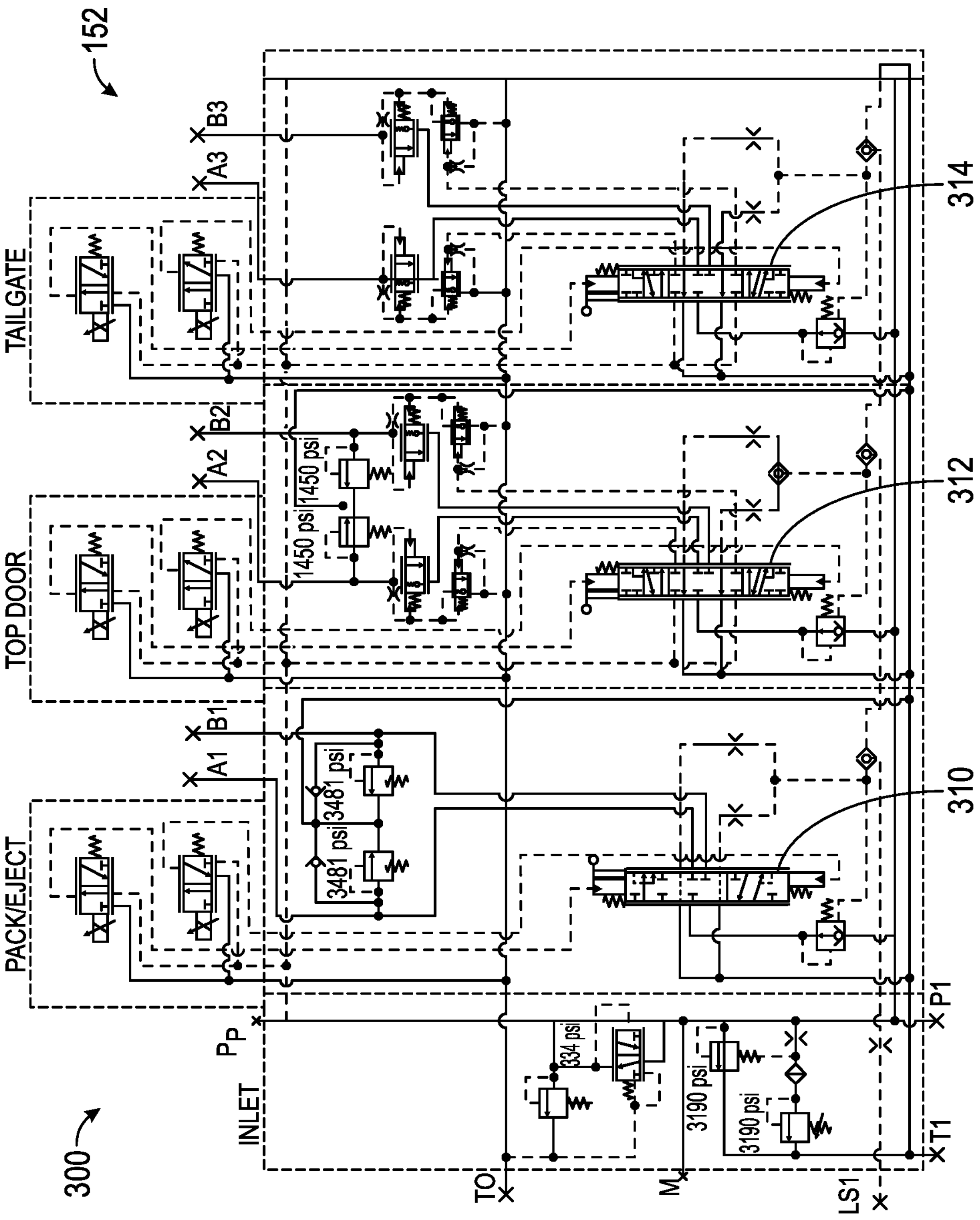
Figure 12:
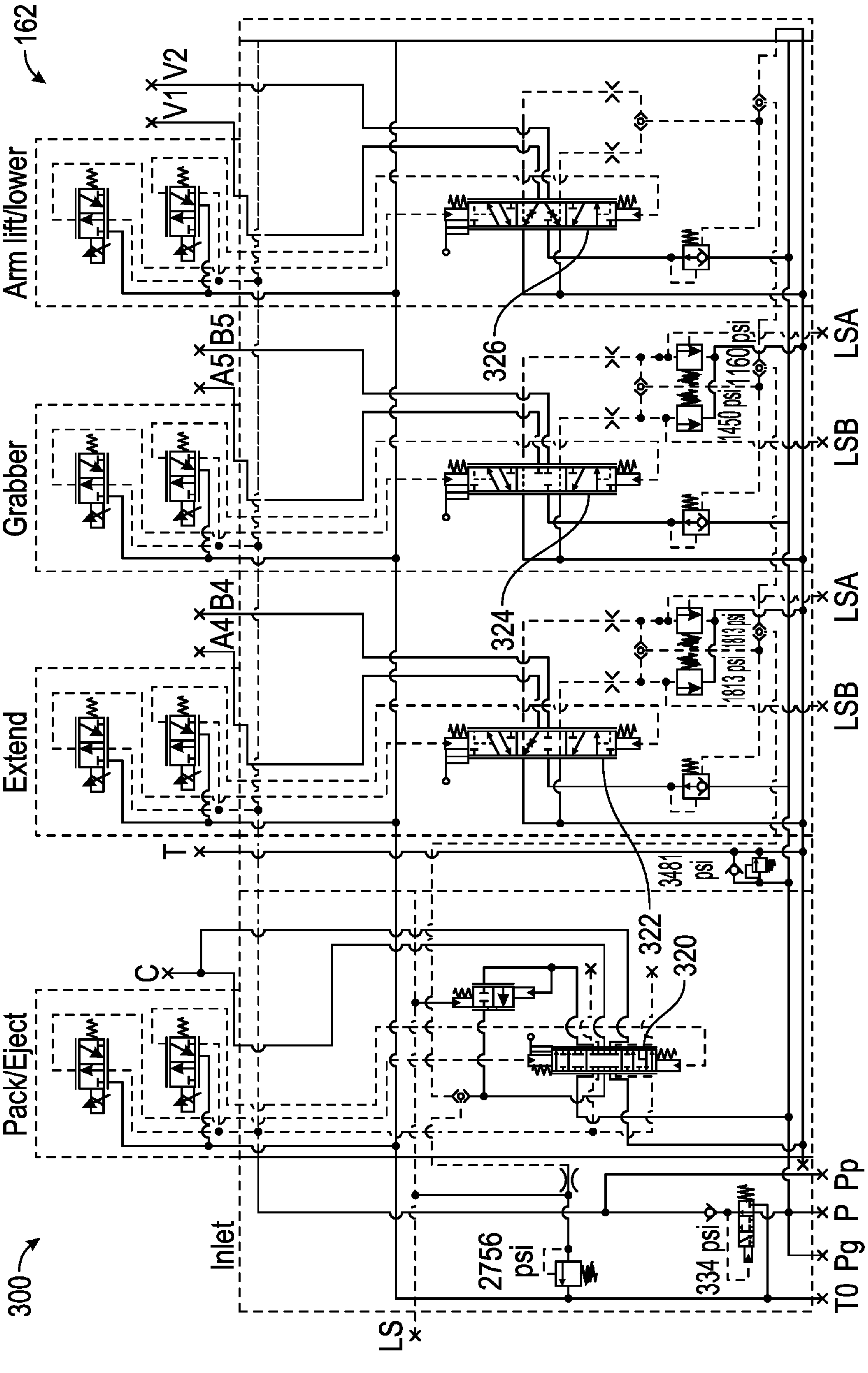
Figure 13:
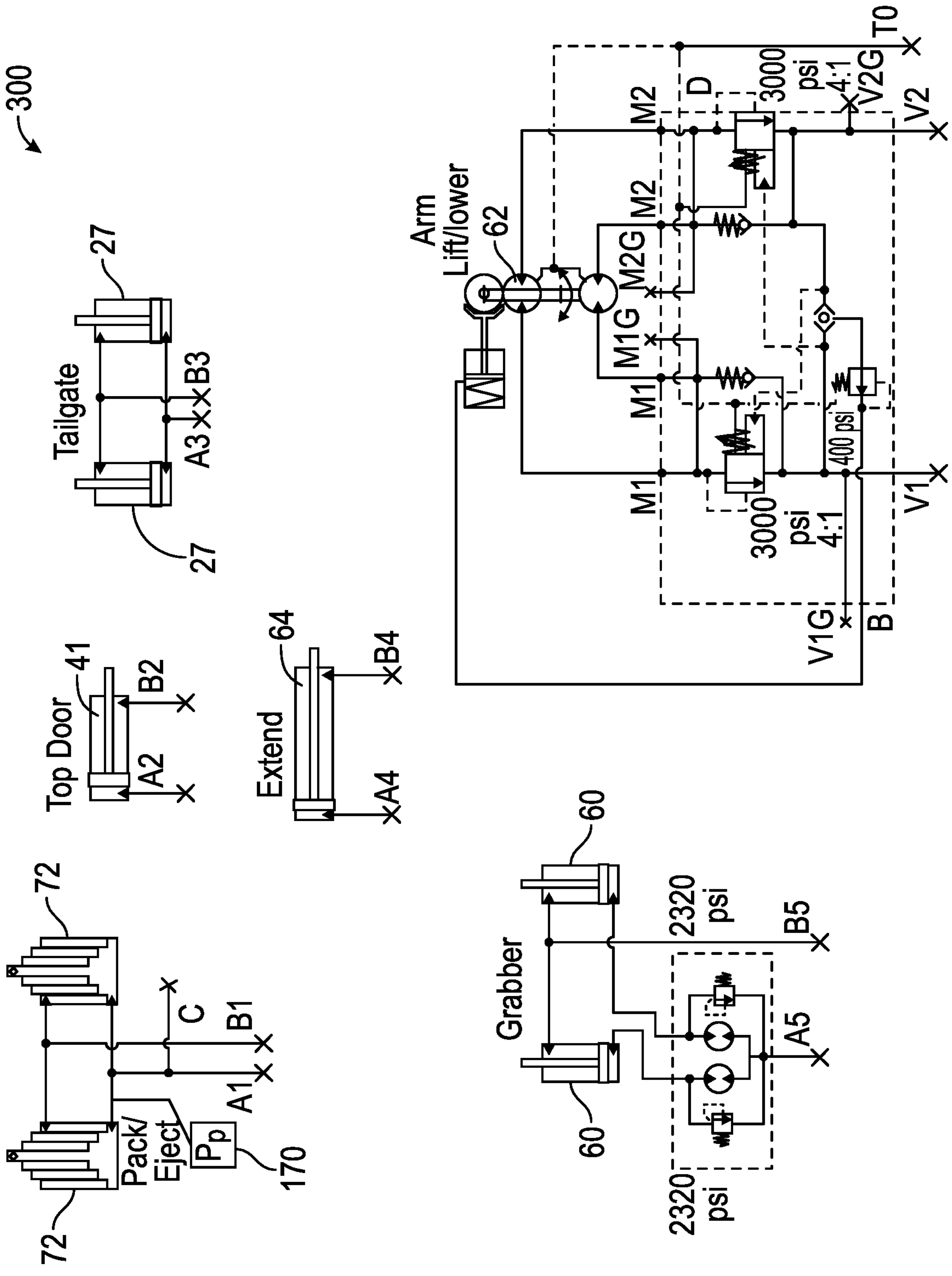

As shown in FIGS. 11 and 12, the control circuit 152 and the control circuit 162 include various valves that control the flow of fluid between the front pump 150 and the rear pump 160 and the various actuators powered by the pumps. A directional control valve 310 controls the flow of fluid from the rear pump 150 to the packer actuators 72. A directional control valve 312 controls the flow of fluid from the rear pump 150 to the top door actuator 41. A directional control valve 314 controls the flow of fluid from the rear pump 150 to the tailgate actuators 27. A directional control valve 320 controls the flow of fluid from the front pump 160 to the packer actuators 72. A directional control valve 322 controls the flow of fluid from the front pump 160 to the grabber extend actuator 64. A directional control valve 324 controls the flow of fluid from the front pump 160 to the grabber actuators 60. A directional control valve 326 controls the flow of fluid from the front pump 160 to the grabber lift actuators 62. Each of these directional control valves may be controlled by the controller 110 (e.g., electronically) and/or manually controller (e.g., using one or more levers).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse vehicle comprising:

a body defining a storage compartment;

a packer coupled to the body;

a hydraulic system comprising a first pump, a second pump, and a packer actuator, the first pump and the second pump configured to supply fluid power to the packer actuator and to one or more components of the refuse vehicle that are configured to perform one or more other vehicle functions, wherein the packer actuator is coupled to the packer and the body and positioned to move the packer in a compacting direction to compact refuse within the storage compartment;

a pressure sensor fluidly coupled to the packer actuator and configured to indicate a measured pressure of at least one of a first fluid associated with the first pump or a second fluid associated with the second pump; and a controller operatively coupled to the packer actuator, the hydraulic system, and the pressure sensor and configured to:

control the hydraulic system to supply fluid power to the packer actuator such that the packer actuator moves the packer, at a first rate, in the compacting direction;

determine that (a) the one or more other vehicle functions are active and (b) the measured pressure exceeds a threshold pressure; and reduce, with the packer in a partially extended position, the fluid power supplied to the packer actuator while maintaining an amount of fluid power supplied to the one or more components, to adjust a load applied to at least one of the first pump or the second pump, wherein the fluid power provided to the packer actuator is reduced by an amount such that the packer actuator moves the packer, at a second rate, in the compacting direction without impacting a performance of the one or more components;

wherein a determination that (c) the one or more other vehicle functions are inactive or (d) the measured pressure is less than the threshold pressures results in an increase to the fluid power supplied to the packer actuator.

2. The refuse vehicle of claim 1, wherein the first pump is fluidly coupled to one of a grabber arm actuator, a lift arm actuator, or a fork actuator, wherein the one or more other vehicle functions are associated with the grabber arm actuator, the lift arm actuator, or the fork actuator.

3. The refuse vehicle of claim 1, wherein the first pump configured to supply the first fluid to the packer actuator, the second pump configured to supply the second fluid to the packer actuator and wherein reducing the fluid power to the packer actuator comprises reducing one of (a) a pressure of the first fluid or (b) a flow rate of the first fluid.

4. The refuse vehicle of claim 3, wherein the pressure of the first fluid is reduced by actuating a displacement actuator of the first pump.

5. The refuse vehicle of claim 1, wherein the first pump configured to supply the first fluid to the packer actuator, the second pump configured to supply the second fluid to the packer actuator and wherein reducing the fluid power to the packer actuator comprises preventing flow of the first fluid to the packer actuator.

6. The refuse vehicle of claim 1, wherein the threshold pressure is based on a mode of operation of the refuse vehicle.

7. The refuse vehicle of claim 1, wherein the controller is further configured to:

determine that the packer actuator is fully extended; and control the hydraulic system to supply fluid power to the packer actuator such that the packer actuator moves the packer in a retracting direction.

8. A refuse packing system, comprising:

a packer coupled to a body, wherein the body defines a storage compartment;

a hydraulic system comprising a first pump, a second pump, and a packer actuator, the first pump and the second pump configured to supply fluid power to the packer actuator and to one or more components of the refuse vehicle that are configured to perform one or more other vehicle functions, wherein the packer actuator is coupled to the packer and the body and positioned to move the packer in a first direction;

a pressure sensor fluidly coupled to the packer actuator and configured to indicate a measured pressure of at least one of a first fluid associated with the first pump or a second fluid associated with the second pump; and a controller operatively coupled to the packer actuator, the hydraulic system, and the pressure sensor and configured to:

control the hydraulic system to supply fluid power to the packer actuator such that the packer actuator moves the packer, at a first rate, in the first direction;

determine that (a) the one or more other vehicle functions are active and (b) the measured pressure exceeds a threshold pressure; and reduce, with the packer in a partially extended position, the fluid power supplied to the packer actuator while maintaining an amount of fluid power supplied to the one or more components, to adjust a load applied to at least one of the first pump or the second pump, wherein the fluid power provided to the packer actuator is reduced by an amount such that the packer actuator moves the packer, at a second rate, in the first direction without impacting a performance of the one or more components;

wherein a determination that (c) the one or more other vehicle functions are inactive or (d) the measured pressure is less than the threshold pressures results in an increase to the fluid power supplied to the packer actuator.

9. The refuse packing system of claim 8, wherein the first pump is fluidly coupled to one of a grabber arm actuator, a lift arm actuator, or a fork actuator, wherein the one or more other vehicle functions are associated with the grabber arm actuator, the lift arm actuator, or the fork actuator.

10. The refuse packing system of claim 8, wherein the first pump configured to supply the first fluid to the packer actuator, the second pump configured to supply the second fluid to the packer actuator and wherein reducing the fluid power to the packer actuator comprises reducing one of (a) a pressure of the first fluid or (b) a flow rate of the first fluid.

11. The refuse packing system of claim 10, wherein the pressure of the first fluid is reduced by actuating a displacement actuator of the first pump.

12. The refuse packing system of claim 8, wherein the first pump configured to supply the first fluid to the packer actuator, the second pump configured to supply the second fluid to the packer actuator and wherein reducing the fluid power to the packer actuator comprises preventing flow of the first fluid to the packer actuator.

13. The refuse packing system of claim 8, wherein the threshold pressure is based on a mode of operation of the refuse vehicle.

14. The refuse packing system of claim 8, wherein the controller is further configured to:

determine that the packer actuator is fully extended; and control the hydraulic system to supply fluid power to the packer actuator such that the packer actuator moves the packer in a retracting direction.

* * * * *